INVENTOR
RONALD KITCHENER

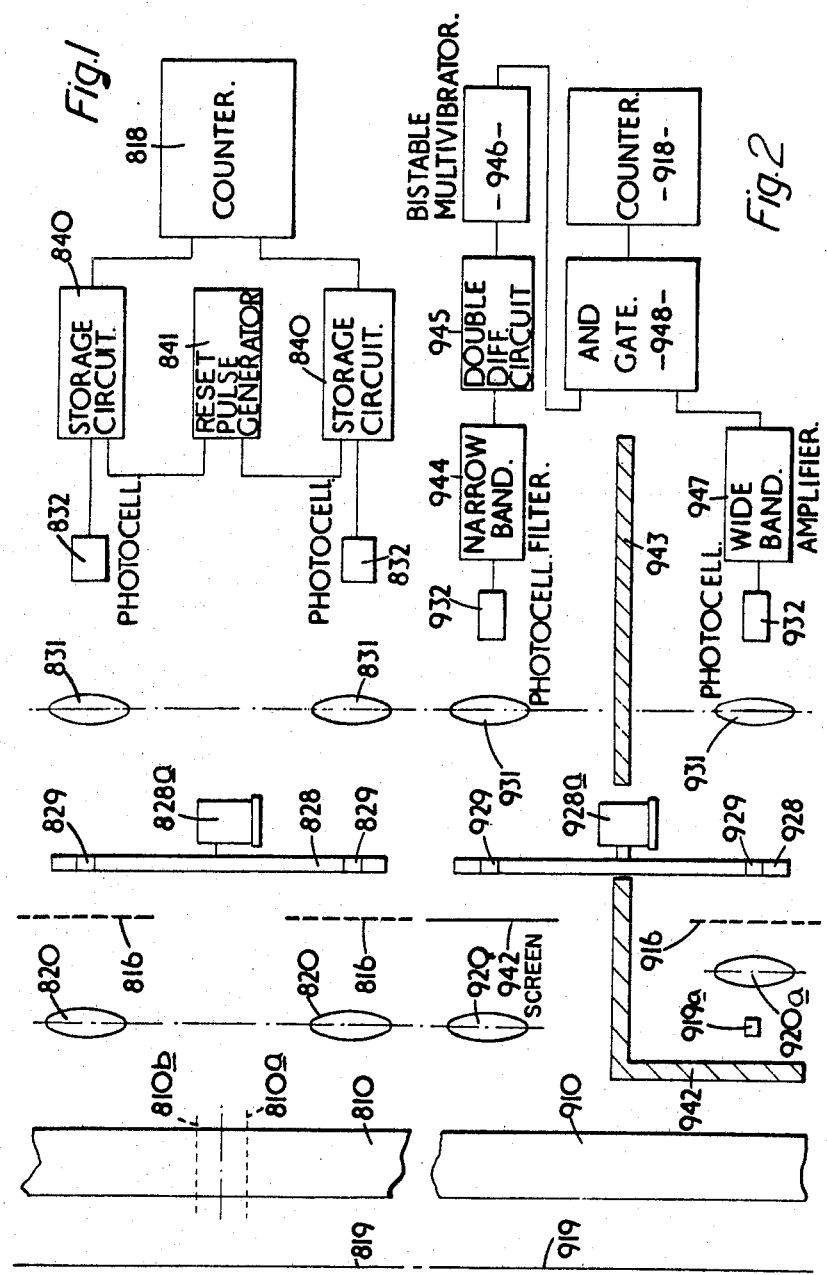

BY
ATTORNEYS

United States Patent Office 3,475,611
Patented Oct. 28, 1969

3,475,611
PHOTO-SENSITIVE APPARATUS FOR CONTACTLESSLY MEASURING A DIMENSION OF AN ARTICLE
Ronald Kitchener, Wolverhampton, England, assignor to G.K.N. Group Services Limited, Smethwick, England, a British company
Filed June 30, 1966, Ser. No. 561,795
Claims priority, application Great Britain, June 30, 1965, 27,645/65
Int. Cl. H01j 39/12
U.S. Cl. 250—214                    6 Claims

ABSTRACT OF THE DISCLOSURE

Apparatus for contactless measurement of the dimension of an article wherein the number of short electrical pulses in a group generated by scanning a grating or a succession of photocells is determined by optical superposition on the grating or photo-cells of an image of the article, or by electrically gating the short pulses with a long pulse generated by scanning the optical image of the article. Scanning is effected across the article in two opposite directions to eliminate errors due to change of position of the article in the direction of scan. Separate electrical channels having relatively narrower and wider pass bands of frequency are provided for handling the long and short pulses respectively prior to gating.

---

This invention relates to a method of measuring a dimension of an article and to an apparatus for carrying out the method.

The invention has been developed primarily in relation to the measurement of the dimension presented between opposite boundaries of an article which has been raised to a high temperature, for example a metal billet produced by hot rolling or a metal stamping or forging produced between cooperative stamping or forging dies, whilst the metal is raised to a temperature such that it can undergo large deformations by means of a plastic flow. To ensure satisfactory control of dimensional tolerances to which such articles are produced it is desirable that they should be subjected to measurement in respect of one or more dimensions presented between opposite boundaries of the article after the rolling, stamping, forging, or other hot working operation has taken place. If then there is a systematic departure from the required dimensional tolerances, steps can be taken promptly to investigate the cause thereof and correct same before large numbers of articles outside the dimensional tolerances have been produced.

Measurement of a dimension involving contact with the article concerned would necessitate the use of feeler or contact parts on the measuring apparatus able to withstand temperatures such as those involved in hot rolling, stamping and forging operations and which typically are of the order of 1000° C. or more and considerable expense would be entailed in the construction of measuring devices suited to this method of measurement. Further, the use of feeler or contact parts imposes a minimum time limit for performance of the measuring operation which may be higher than can be accepted in some manufacturing or testing sequences.

Contactless measuring devices are also known in which an electron emissive element responsive to the incidence of radiation (for example in the infra-red band) has been operatively associated with a scanning device for effectively traversing the line of sight of the emissive element in the direction of the dimension to be measured, from a position outside one of the boundaries of the articles, across the article, to a position outside the opposing boundary so as to produce a pulse of current from the photo-cell having a duration dependent upon the magnitude of the dimension to be measured. The accuracy of this form of apparatus is, however, dependent upon the velocity of scan being maintained constant, not only during each individual scan but over an extended period of time.

Time base circuits for scanning devices which meet this requirement are expensive.

The object of the present invention is to provide a new or improved method and form of apparatus whereby these problems may be more satisfactorily met than has hitherto been the case.

According to one aspect of the invention apparatus for measuring a dimension of an article cmprises means for forming a first radiant energy pattern in the form of an image of the article such as to present the dimension to be measured between opposite boundaries of the image, means for forming a second radiant energy pattern presenting, along a given direction, a succession of areas of which one set occupying alternate positions afford one level of illumination and the other set occupying positions intervening between those of the first set afford a lower level of illumination, means for scanning said first and second patterns between said boundaries and along said directions respectively, and photo-electric means operatively associated with said scanning means for generating a group of electrical digit signals confined to that interval when both said first and second patterns are undergoing scanning.

Confining of the generation of electrical digit signals to that time interval when both said first and second patterns are undergoing scanning may be effected by so positioning the means for forming the first and second patterns that these are superimposed on each other. Alternatively, instead of this "optical" coincidence the means for forming the first and second patterns may be so positioned relatively to each other that these patterns are formed respectively at first and second pattern forming stations. In this case the photo-electric means includes channels for the passage of electrical signals derived respectively from scanning the first and second patterns and gating means would be provided for electrical gating signals fed thereto from these channels respectively. This second form of apparatus has certain important advantages as hereinafter more fully explained, notably that it enables the noise level to be kept low without impairing the discrimination and thereby the accuracy of measuring.

The invention further resides in a method of measuring the dimension of an article comprising the steps of forming a radiant energy pattern in the form of an image of the article such as to present the dimension to be measured between opposite boundaries of the image defined by a change in the level of illumination, energising with radiant energy a digit signal forming surface presenting along a given direction alternate areas which are respectively active and inactive to said radiant energy to form a further pattern of alternating levels of illumination along said direction, scanning both said image and said surface between said boundaries and along said direction respectively to substitute time for distance as the coordinate against which intensity of illumination varies, photo-electrically converting said variation of intensity of illumination into an electrical signal while confining development of said signal to that interval when both said image and said surface are being scanned.

The digit signal generating surface is preferably in the form of a grating. This presents a surface which has lines or bars which prevent or restrict the transmission of the radiant energy image and form the inactive areas, and has intervening parts which permit of the transmission of radiant energy from the image and form the active areas.

The digital signal generating surface may, however, be constituted by an assembly of electron emissive or conductive elements responsive to undergo a change in emission or conductivity as the case may be upon incidence of the radiant energy image, such elements being spaced apart and the spaces between them constituting the inactive areas of the surface.

The term "surface" is used broadly to denote the area presented collectively by the elements notwithstanding that the inactive areas of the surface may, in fact, be constituted by spaces between the elements.

Various forms of apparatus in accordance with the invention will now be described by way of example with reference to the accompanying drawings in which these forms of apparatus are illustrated diagrammatically, and wherein:

FIGURE 1 is a diagrammatic plan view of a form of apparatus wherein scanning is in opposite directions concurrently to compensate for displacement of the article in the direction of measurement:

FIGURE 2 is a diagrammatic view of a further form of apparatus wherein the grating and the radiant energy image are formed at separate stations and are separately scanned and the electrical signals thereby produced are gated with each other to produce digit signals representative of the dimension to be measured:

Referring firstly to FIGURE 1, the article of which a dimension is required to be measured is indicated at 810 and may be in the form of an elongated workpiece, such as a billet or a rolled section advanced continuously on any suitable form of conveyor means, as for example rollers which may be driven.

The dimension to be measured is the dimension between the upper and lower boundaries.

The article may already, as a result of the rolling or other hot working operation, have been raised to a temperature at which radiant energy in the infra-red band is emitted by the article.

An inverted image of the article is formed remotely from the article by means of infra-red lens elements 820.

In the plane of the image are disposed gratings 816 consisting of a plurality of bars or lines extending in a direction parallel to the upper and lower boundary edges of the article. In a typical case there may be approximately 200 bars or lines per inch and a corresponding number of intervening spaces each of a width equal to, or of the same order of, that of the bars or lines, but this number may be varied in accordance with the accuracy with which the measurement of the dimension between the boundaries is required to be made.

Figure 4:
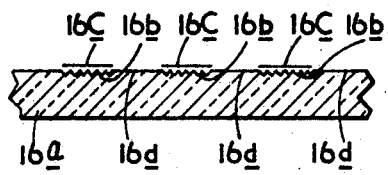
FIGURE 4 is a fragmentary view in cross-section in a plane normal to the surface showing one form of grating which may be employed in the forms of apparatus illustrated in FIGURES 1 and 2.

One suitable form of grating is illustrated in FIGURE 4. This comprises a base member in the form of a plate 16a of a material transparent or translucent to the radiation employed, carrying on one face thereof a plurality of parallel bands 16c of a material which is opaque to the radiation and separated by spaces 16d.

The plate 16a may be formed of glass. The bands 16c may be formed of a material containing carbon or may be a metal such as aluminium.

If carbon is employed for the bands, the surface of the glass may be etched as indicated at 16b, this being effected by first covering the surface of the glass with a barrier material, such as wax, and ruling lines thereon with a ruling machine of the width of the bands 16c to remove the barrier material, etching then being effected by any suitable etching agent.

A medium containing the carbon and a suitable binder then adheres to the etched areas and surplus can be cleaned off by removing the barrier material still adhering in the clear spaces 16d.

If the opaque material is metal, such as aluminium, it may be deposited by vacuum forming on the etched bands 16b. The winds of the bands 16c of opaque material and the clear spaces 16d may be equal to each other or approximately so.

On the side of the gratings 816 remote from the article 810 is disposed a scanning device and detector device operating in combination.

The two radiant energy patterns, one formed by the image and the other by the grating, are effectively superimposed on each other, the former provides variation of intensity of illumination as a function of distance measured between opposed boundaries of the image presenting the dimension to be measured. In the case of the grating, the variation in intensity of illumination occurs transversely of the bands and spaces. Scanning by photo-sensitive means converts this variation of intensity into an electrical signal which varies as a function of time, and which consists of a succession of pulses forming digital signals. The superposition of the two patterns confines the generation of digital signals to the time interval when both the illuminated portion of the pattern formed by the image and the grating are simultaneously subjected to scanning.

The output from the detector device consisting of the pulses forming digital signals, is fed to a counting device 818 which includes a digital indicator for displaying the number of such pulses in the output signal of the scanning device for each complete trace or traverse of the scanning beam from one limit of the gratings upper or lower to the other limit lower or upper. The number of such pulses is representative of the dimension between the upper and lower boundaries of the article, and such number is independent of whether the scanning speed is constant or varies from time to time, and is independent of any departure from linearity of the scanning speed during an individual scanning trace or sweep.

The article 810 may be at a temperature such that it does not iself emit any or any significant radiation in the infra-red band. In this case a visible light source 819 is provided furnishing diffuse radiation over an extended area of substantial size is provided, and the lenses 820 again form inverted images on the grating 816 of the article. A suitable light source would be a tungsten filament lamp or an arc lamp.

On the side of the gratings 816 remote from the article is disposed a rotary mask in the form of a disc 828 having apertures 829 preferably in the form of circular holes having a diameter not substantially exceeding the width of each of the dark or inactive bands produced by the bars or lines of the gratings in the plane of the mask. The mask 828 is driven by a suitable motor 828a, such as an electric motor.

The rotary mask 828 has its apertures formed at diametrically opposed positions, the two object lenses 820 to form radiant energy images of the same section of the article 810, as indicated between the lines 810a and 810b, on respective gratings 816.

Two photo-cells 832 receive inputs through the intermediary of condensing lenses 831 by virtue of the scanning of the respective gratings 816 in opposite directions simultaneously, one from the top down, and the other from the bottom up, and the resultant outputs consisting of a group of digital pulses fed to respective storage circuits 840. All such storage circuits include a series of bi-stable multi-vibrator circuits which are respectively set from an initial "0" condition to a "1" condition by receipt of successive pulses.

These multi-vibrator circuits are then restored to the original "0" condition by reset pulses from a clock pulse generator 841 to deliver the corresponding number of pulses to the counter 818. Delivery of pulses from the two storage circuits is arranged to take place sequentially so that the counter records the aggregate of all the pulses stored in both circuits 840. The counter may incorporate a division circuit for dividing this total by two and hence recording the average of the number of pulses stored in each circuit 840.

If there is some vertical component of movement imparted to the article 810 over the period during which scanning takes place, the number of pulses in one channel, and hence storage circuit, will be decreased and there will be a corresponding increase in the number of pulses passing down to the other channel and stored in the storage circuit thereof.

The arrangement thus compensates for any component of vertical movement of the article.

In the form of apparatus illustrated in FIGURE 2 parts corresponding to those already described are designated by like numerals of reference with the prefix 9.

In this arrangement the grating 916 and the radiant energy image are formed at separate stations conveniently spaced apart diametrically as viewed in plan with respect to the scanning mask 928, which is formed with diametrically opposed scanning apertures 929. The radiant energy image may be formed on a screen 942 which does not embody a grating. The radiant energy image is formed either by radiation from the article 910 in the infra-red band or from a separate source 919.

The grating 916 is illuminated by a separate source 919a. The source 919a need not furnish radiation of the same wave length as that utilised to form the radiant energy image on the screen 942. It can be, and advantageously is, of a power to provide an intensity of illumination of the grating 916 appreciably higher than that which would be obtained were the grating coincident with the screen 942 and illuminated by the same source from which the radiant energy image is formed. The grating 916, lens 920a associated therewith, and source 919a are isolated optically by means of a barrier structure indicated diagrammatically at 943 and which is opaque to radiation of the wave length used.

On the opposite side of the rotary scanning mask the apparatus incorporates two electrical channels, each incorporating photo-cells 932 receiving radiation only from the radiant energy image in one case and only from the grating 916 in the other case, and if necessary isolated optically by a barrier structure 943.

The photo-cell which receives radiation from the radiant energy image feeds an output to a narrow band filter 944 and thence to a double differentiating circuit 945 and finally to a bi-stable multi-vibrator 946.

The photo-cell receiving its output from the grating feeds signals to a wide band amplifier 947.

The outputs from the multi-vibrator 946 and wide band amplifier are gated in an "AND" gate 948, the output of which is fed to a counter 918.

The operation of this apparatus is most conveniently described with reference to FIGURE 3 wherein voltage (or current) level at various stages in the two channels is plotted as ordinate against time as abscissa.

Figure 3:
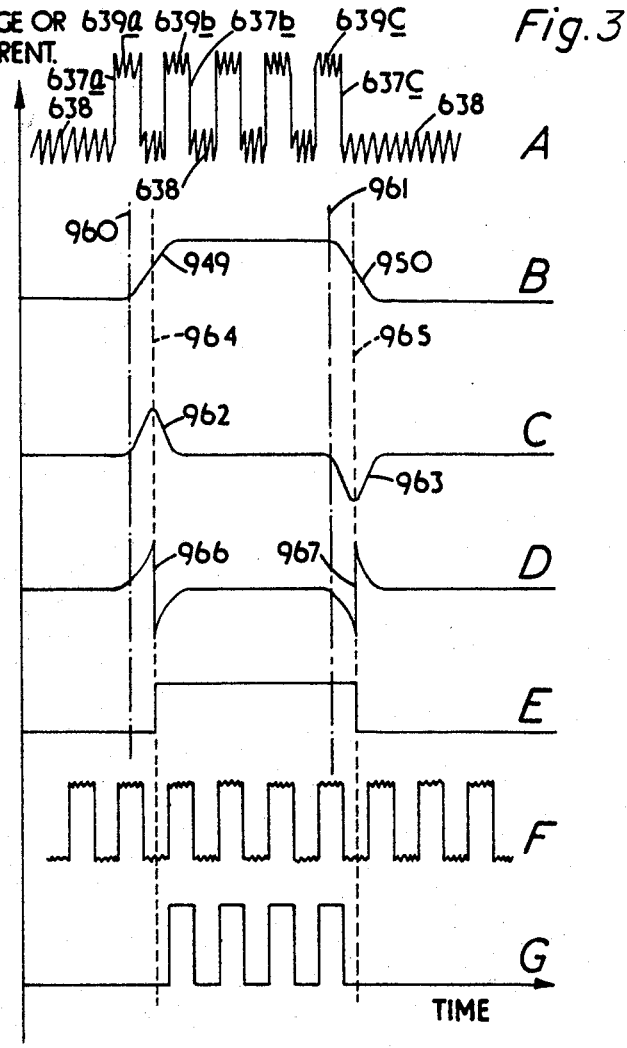
FIGURE 3 is a graphical representation of wave forms occurring in the signal channels of FIGURE 2.

Curve A of FIGURE 3 illustrates typically a wave form which is obtained utilising, for example, the apparatus of FIGURE 1. Pulses such as 637a, 637b and 637c which form individual digit signals represent the output from photo-cell 632 and each such pulse to be detachable has to rise above the general noise level indicated at 638 existing before and after any given group of digit signals and in between individual digit signals. Further, the crests of the individual digit signals also have noise signal superimposed thereon, as indicated at 639a, 639b, 639c.

The amplitude of the noise level at 638 and 639a for example, can be reduced by passing the signal from the photo-cell through an amplifier having a narrow pass band of frequency wihch would exclude a high proportion of the components of frequency present in the noise signals. This, however, stops or attenuates frequency components which are necessary accurately to reproduce the desired digit signals and can, therefore, lead to miscounting.

In the apparatus of FIGURE 2 the channel associated with the screen 942, in which the radiant energy image is formed includes a narrow band filter 944 and the output from this filter is thus as represented in curve B of FIGURE 3. This has leading and trailing wave fronts 949 and 950 which are of gradual slope and of which the beginning in each case, as represented by the vertical projection lines 960 and 961, correspond to the start and finish of the scanning of the image.

The output represented by wave form at B in FIGURE 3 is passed through the double differentiating circuit 945, the first stage of which differentiates away from B to produce rounded positive-going and negative-going pulses 962 and 963 centred respectively on projection lines 964 and 965 passing through the mid points of the sloping portions 949 and 950. Consequently the distance between the crest of 962 and the trough of 963 also is representative of the time interval between the start and end of scanning of the radiant energy image.

In the second stage of the circuit 945 the pulses are further differentiated to form double pulses as illustrated in curve D of FIGURE 3. Such pulses embody steep cross-over portions 966 and 967, of which the former is negative-going and the latter positive-going and which are again co-incident at their centers with the projection lines 964 and 965.

The wave form portions 966 and 967 are utilised to change the bi-stable multi-vibrator 946 from its "0" state to its "1" state and back again, and this consequently furnishes a square wave pulse as shown in wave form E having a duration corresponding to the time interval between the beginning and end of scanning of the radiant energy image.

Consequently the gating of this wave form in "AND" gate circuit 948 with individual digit pulses fed to the gate circuit from the wide band amplifier 947 produces an output consisting of groups of digit pulses, the number of which is determined in each group by the length of the square wave pulse shown in section E of FIGURE 3.

The higher power of the source 919a and resultant increased intensity of illumination of the grating 919 reduces the level of noise present at the base line from which the digit signal pulses rise and the level of noise at the crest of each pulse. These are as shown typically in section F of FIGURE 3 and the resultant gated group in shown in section G. Due to the lower noise level the possibility of failure to count a digit signal pulse at the beginning or at the end of a group is substantially eliminated, and the apparatus is useable at intensity levels of illumination of the radiant energy image well below the minimum levels which would provide accurate information in forms of apparatus where the radiant energy image is actually formed on the grating or is otherwise brought into coincidence "optically" therewith.

This form of apparatus is, therefore, especially suited to cases where it is convenient to employ infrared radiation from the article itself to form the radiant energy image but where the temperature of the article is such that the intensity of illumination of this image is low.

What I claim then is:

1. Apparatus for measuring the dimension of an article comprising:
    (a) means for forming a first radiant energy pattern in the form of an image of the article such as to present the dimension to be measured between opposite boundaries of the image,
    (b) means for forming a second radiant energy pattern presenting, along a given direction, a succession of areas of which one set occupying alternate positions affords one level of illumination and the other set occupying positions intervening between those of the first set affords a lower level of illumination, (c) means for scanning said first and second patterns between said boundaries and along said direction respectively, and including:
  (a) (i) one scanning element and means for traversing same between said boundaries and along said direction relative to said first and second patterns respectively in a forward sense,
  (b) (ii) a further scanning element and means for traversing same between said boundaries and along said direction relative to said first and second patterns in a reverse sense,
  (c) (d) photo-electric means operatively associated with said scanning means for generating a group of electrical digit signals confined to that interval when both said image and said pattern are undergoing scanning, said photo-electric means including photo-electric elements connected respectively to channels for feeding groups of electrical digit signals generated in response to scanning by said one and further scanning elements, and
  (d) (e) means for adding or averaging the number of digit signals in said groups fed along said channels respectively.

2. Apparatus according to claim 1 wherein:
  (a) each of said scanning elements comprises
    (i) a movable component
    (ii) a stationary component
  (b) one of said components of said scanning element has a plurality of apertures spaced apart along said direction and has portions between successive apertures which are opaque to said radiant energy and each having a dimension in said direction equal to, or of the same order as, that of each of said apertures in said direction,
  (c) the other of said components has an aperture which, in said direction, has a dimension equal to, or of the same order as, that of each said opaque portions,
  (d) means are provided for mounting said components in overlapped relation with each other to bring each of said spaced apertures in one component successively into coincidence with said apertures of said other component,
  (e) means are provided for moving each of said movable components to effect said traverses of said scanning elements in said forward and reverse senses respectively.

3. Apparatus according to claim 2 wherein:
  (a) said stationary components each comprises a grating,
  (b) said movable components comprise spaced portions of a mask rotatable about an axis, said portions being formed with respective single apertures located at diametrally opposed positions relative to said axis,
  (c) means are provided for rotating said mask.

4. Apparatus for contactlessly measuring the dimension of an article, comprising means for forming a radiant energy image of the article, such image presenting the dimension to be measured, a digit signal generating surface formed to present, along one direction, areas which are active and inactive respectively in response to incidence of radiant energy, a scanning means for scanning said image and for scanning said surface along said direction to produce, in combination with photo-electric detector means, an electrical dimension signal and a train of digit signals, and means for deriving a group of said digit signals confined to a time interval during which both said dimension signal and said digit signals co-exist, said group thus containing a unmber of said digit signals representative of the dimension to be measured, said apparatus including the improvement wherein:
  (a) said digit signal generating surface is located at a station spaced from said radiant energy image,
  (b) a source of illumination for said digit signal generating surface is provided, said source being separate from the means for forming said radiant energy image of said article,
  (c) said detector means includes separate detector elements responsive to said radiant energy image and said surface respectively to generate respectively said electrical dimension signal and said digit signals,
  (d) said detector means further includes separate dimension and digit channels connected respectively to said separate detector elements for passage respectively of said dimension signal and said digit signals,
  (e) said dimension channel includes means for providing a narrower pass band of frequency than that of said digit channel,
  (f) said dimension channel further includes means for developing from said dimension signal a derived dimension signal having steep leading and trailing fronts accurately co-incident with selected points on more gradually sloping leading and trailing fronts presented by said dimension signal after passage through said means providing said narrower pass band,
  (g) and said means for deriving said group of digit signals comprises gate circuit means for receiving both said digit signals and said derived dimension signal as inputs.

5. Apparatus according to claim 4 wherein:
  (a) said dimension channel includes a relatively narrow band filter means followed by a differentiating circuit means for forming said derived dimension signal,
  (b) and said digit channel for receiving said digit signals includes a relatively wide band amplifier means.

6. Apparatus according to claim 4 wherein:
  (a) said digit signal generating surface comprises a grating means,
  (b) said source of radiant energy for illuminating said grating provides an intensity of illumination higher than that presented by said radiant energy image of said article.

References Cited

UNITED STATES PATENTS

| | | | |
|---|---|---|---|
| 3,094,623 | 6/1963 | Weiss | 250—219 X |
| 3,159,749 | 12/1964 | Dalrymple et al. | 250—219 X |
| 3,180,995 | 4/1965 | Briggs et al. | 250—223 |
| 3,222,979 | 12/1965 | Webster | 250—219 X |
| 3,254,226 | 5/1966 | Bobula et al. | 250—219 X |
| 3,259,022 | 7/1966 | Vietorisz | 250—219 X |
| 3,311,749 | 3/1967 | Briggs | 250—219 |
| 3,327,125 | 6/1967 | Herchenroeder | 250—219 X |
| 3,364,358 | 1/1968 | Ashworth | 250—219 |
| 3,384,753 | 5/1968 | Revesz | 250—219 |

RALPH G. NILSON, Primary Examiner

T. N. GRIGSBY, Assistant Examiner

U.S. Cl. X.R.

250—214, 219, 220, 223, 237